Oct. 3, 1944.　　　　　J. STUCKE　　　　2,359,536
INTERNAL-COMBUSTION ENGINE
Filed Oct. 3, 1942　　　　8 Sheets-Sheet 1

Inventor
JOHN STUCKE

By Clarence A. O'Brien
and Harvey B. Jacobson
Attorneys

Oct. 3, 1944.  J. STUCKE  2,359,536
INTERNAL-COMBUSTION ENGINE
Filed Oct. 3, 1942  8 Sheets-Sheet 2

Inventor
JOHN STUCKE

By Clarence A. O'Brien
and Harvey B. Jacobson
Attorneys

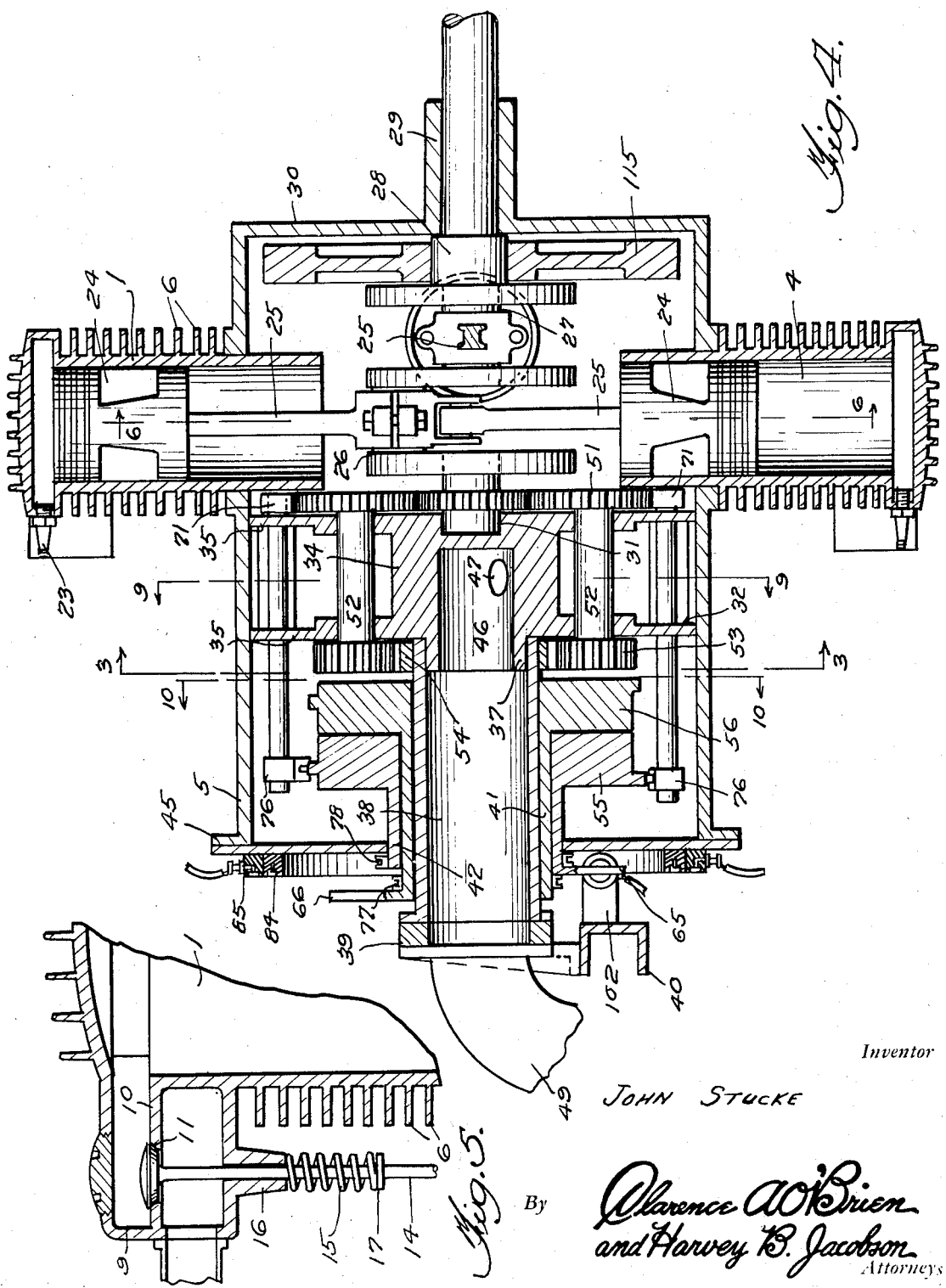

Oct. 3, 1944.                J. STUCKE                2,359,536
                    INTERNAL-COMBUSTION ENGINE
               Filed Oct. 3, 1942        8 Sheets-Sheet 5
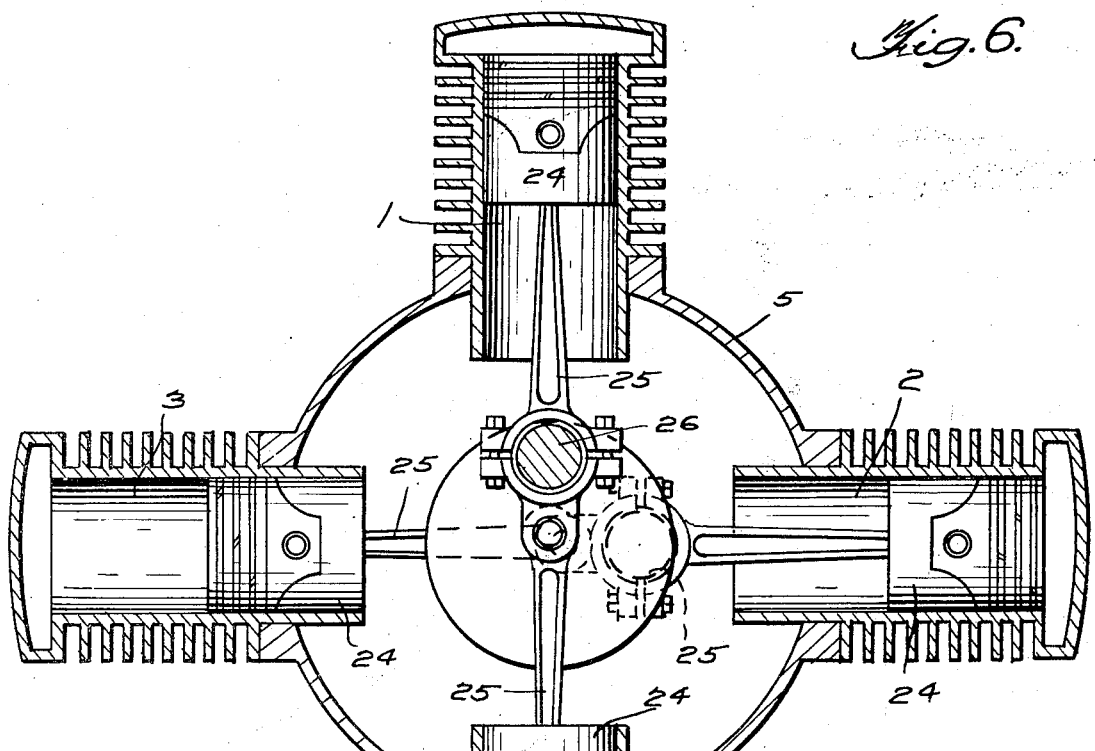
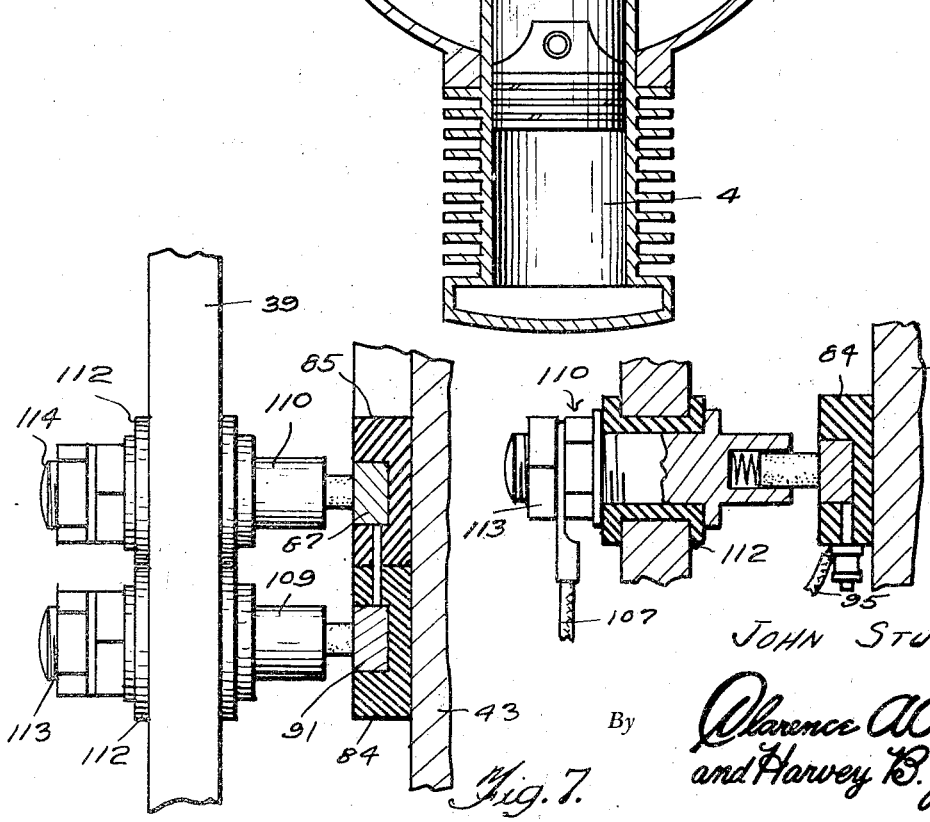
Inventor
JOHN STUCKE
By Clarence A. O'Brien
and Harvey B. Jacobson
Attorneys

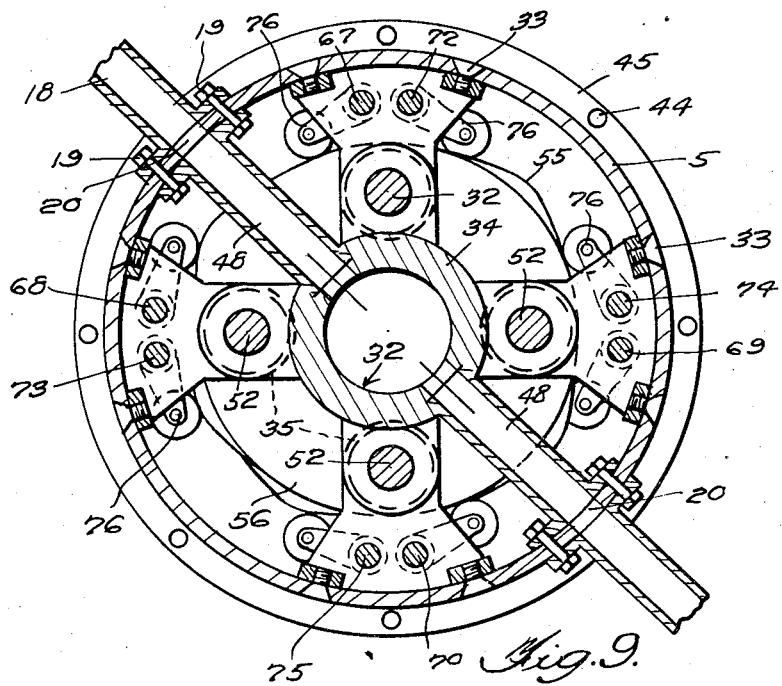
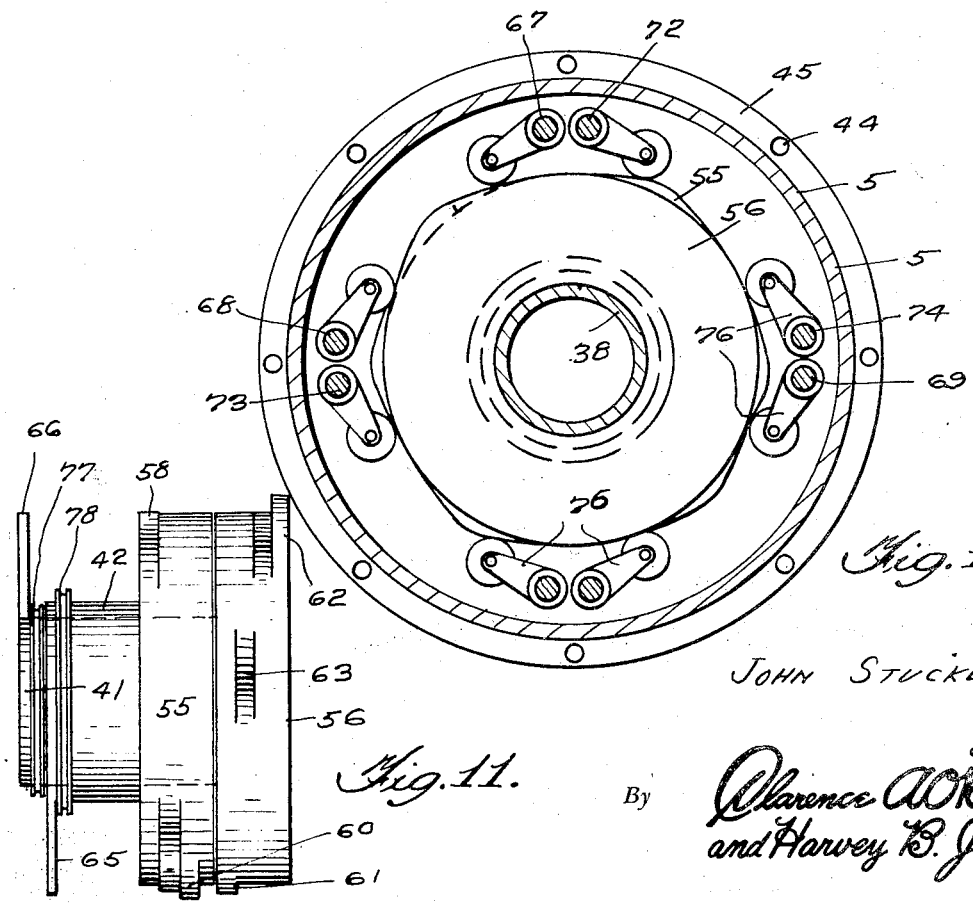

Oct. 3, 1944.   J. STUCKE   2,359,536
INTERNAL-COMBUSTION ENGINE
Filed Oct. 3, 1942   8 Sheets-Sheet 7

Inventor
JOHN STUCKE
By Clarence A. O'Brien
and Harvey B. Jacobson
Attorneys

Patented Oct. 3, 1944

2,359,536

UNITED STATES PATENT OFFICE 2,359,536

INTERNAL-COMBUSTION ENGINE

John Stucke, Philadelphia, Pa.

Application October 3, 1942, Serial No. 460,663

4 Claims. (Cl. 123—44)

My invention relates to rotary internal combustion engines of the radial, so-called, whirlwind type such as is exemplified in my co-pending application Serial No. 341,375, filed June 19, 1940, and of which the instant application is a continuation in part.

The principal object of my invention is to provide a practical, simplified engine of the type above designated designed for high speed operation and power output substantially the equivalent of the conventional internal combustion engine with twice the number of cylinders.

Another object is to provide an engine having the above advantages and which, in addition, is synchronized as regards uniform application of power impulses during an operating cycle with all cylinders, or pistons, regardless of the number, providing a power impulse in a single revolution of the crank shaft.

Still another object is to provide in such an engine for quick, reverse operation, easy reverse control, improved valve operation and fuel feed means.

Other and subordinate objects are also comprehended by my invention, all of which, together with the precise nature of my improvements, will be readily understood when the succeeding description and claims are read with reference to the drawings accompanying and forming part of this specification.

Figure 1:
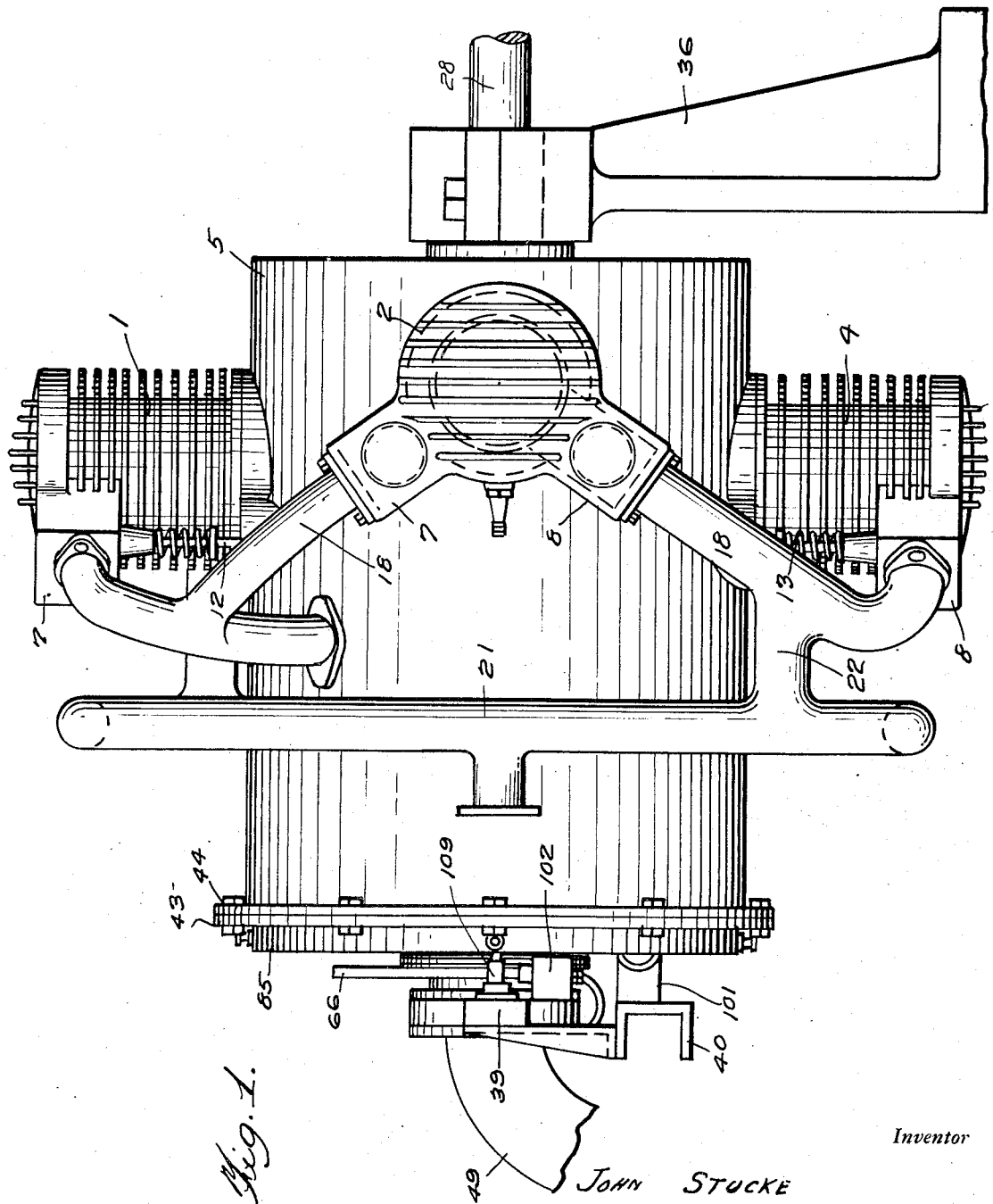
Figure 2:
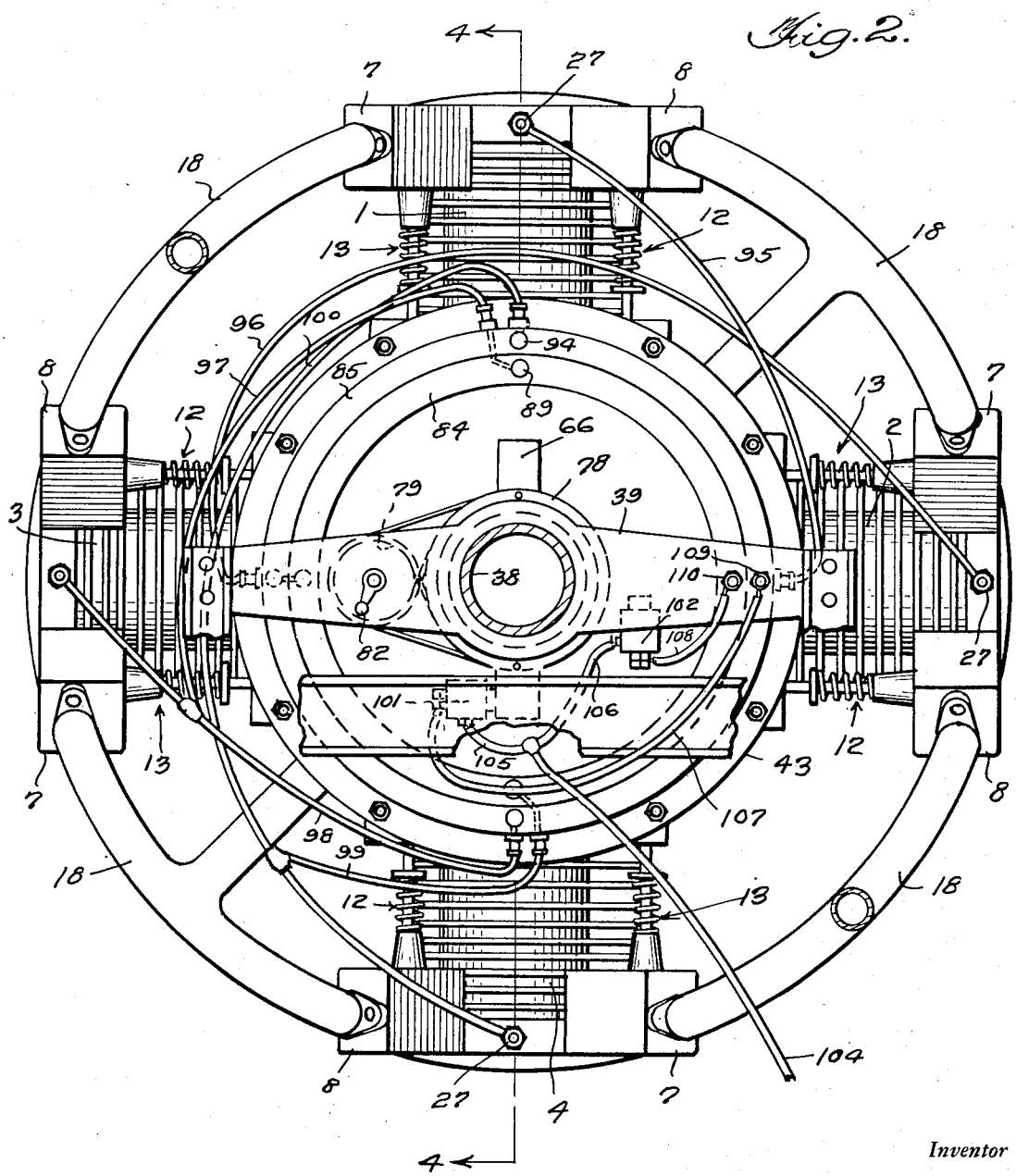
Figure 3:
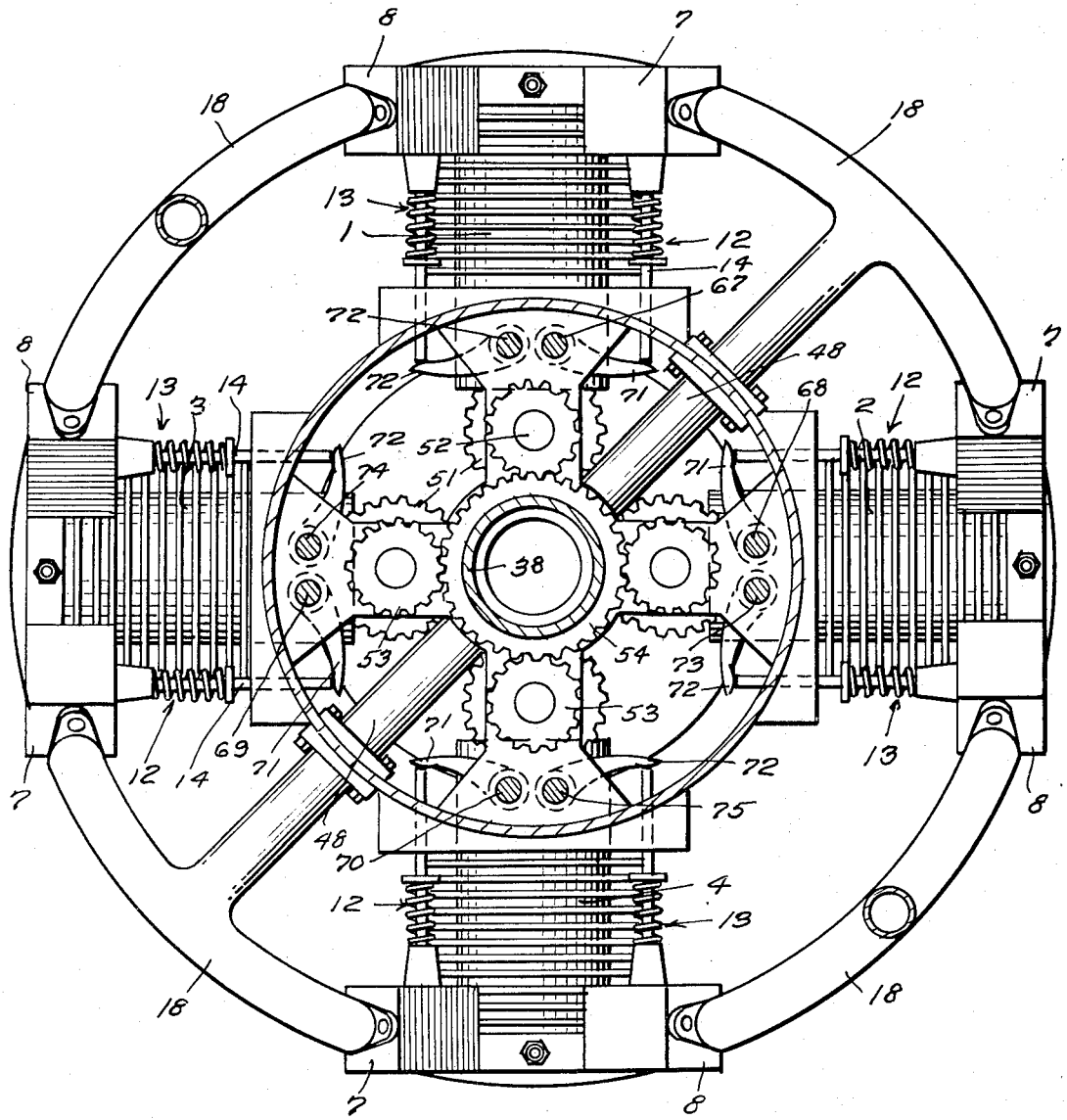
Figure 12:
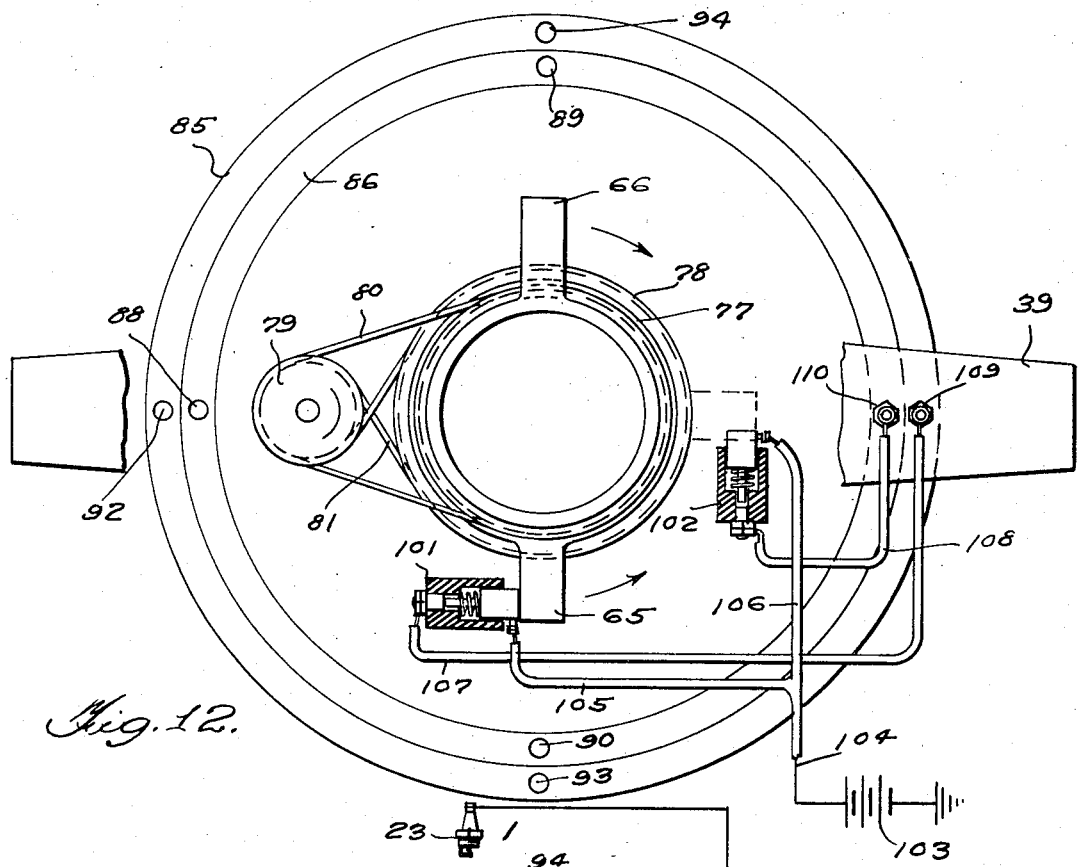
Figure 13:
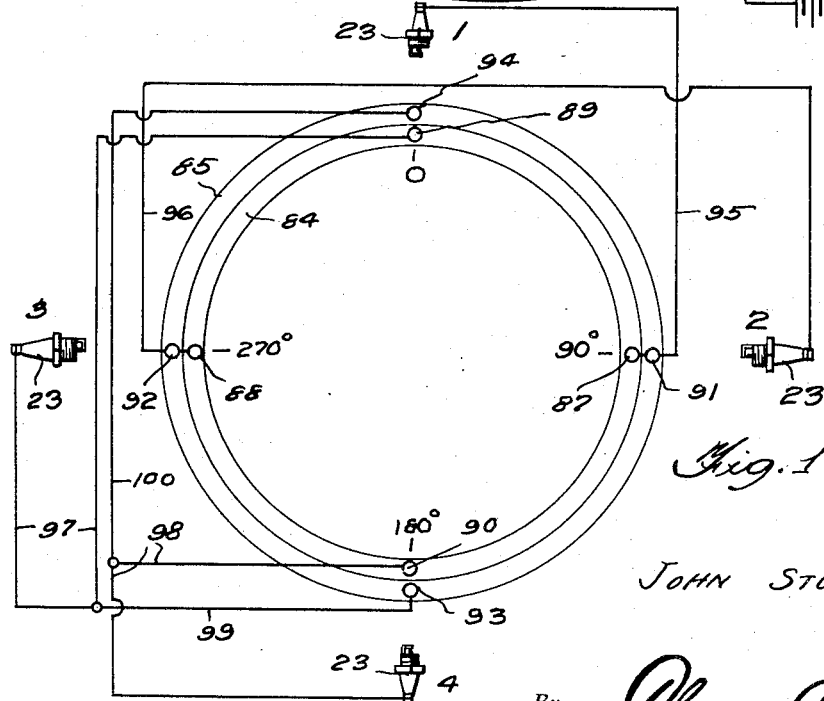

In said drawings:

Figure 1 is a view in side elevation of my improved engine in its preferred embodiment, Figure 2 is a view in end elevation looking at the control front end of the engine, Figure 3 is a view in transverse section taken on the line 3—3 of Figure 4, Figure 4 is a view in longitudinal section taken on the line 4—4 of Figure 2, with parts eliminated, Figure 5 is a fragmentary view in longitudinal section of one of the cylinders and intake valve chamber, Figure 6 is a view in transverse section taken on the line 6—6 of Figure 4, Figure 7 is a detail view in transverse section taken on the line 7—7 of Figure 2 and drawn to an enlarged scale, Figure 8 is a view in transverse section taken on the line 8—8 of Figure 7, Figure 9 is a view in transverse section taken on the line 9—9 of Figure 4, Figure 10 is a similar view taken on the line 10—10 of Figure 4, Figure 11 is a view in side elevation of the valve actuating cams and parts associated therewith, Figure 12 is a detail view in end elevation with parts in section illustrating in detail the forward and reverse control, Figure 13 is a diagrammatic view of the ignition wiring to the spark plugs, and Figures 14, 15, 16 and 17 are views in front elevation illustrating different positions of the valve actuating cams.

Referring to the drawings by numerals, in the illustrated embodiment thereof, the engine of my invention comprises four cylinders numbered 1, 2, 3 and 4, and extending radially for a suitable distance into and from a cylindrical, rotary, horizontally disposed casing 5, said cylinders being grouped in 90 degree angular relation around the casing 5 and arranged in diametrically opposite pairs adjacent what constitutes the rear, power transmitting end of said casing. The pairs of cylinders 1, 4, 2, 3 are staggered longitudinally of the casing 5 for a purpose presently seen. The cylinders 1, 2, 3, 4 are suitably fixed in the casing 5 and provided with the usual fins 6 for air cooling.

Each of said cylinders 1, 2, 3, 4, as shown in Figure 5, is provided on one side thereof, opposite the said power transmitting end of the casing 5, with a pair of radial, divergent castings 7, 8, at the outer end of the cylinder, each forming a lateral valve chamber 9 divided by a partition 10 and opening on one side of the partition into one end of the cylinder. Each partition 10 is formed with a seat 11 for a poppet type valve. The valves 12 in the cylinders 9 of the castings 7 are intake valves, and those in the chambers of the castings 8 and designated 13 are exhaust valves. The valves 12, 13 are provided with stems 14 slidably extended for a short distance into the casing 5 and equipped with the usual valve closing springs 15 interposed between a valve guide 16 on the casing 5 and a collar 17 on the stem.

The valve chambers 9 for the intake valves 12 are connected in pairs by a pair of suitable intake manifold pipes 18 having ends bolted, as at 19, to the casing 5 in communication with a pair of diametrically opposite intake ports 20 provided in said casing between the cylinders and what constitutes the front, control end of said casing 5.

An annular exhaust manifold 21 surrounds the casing 5 between the manifold pipes 18 and said front end of said casing 5 and is provided with branches 22 connecting the valve chambers 9 of the exhaust valves 13 in pairs.

Intermediate the pairs of castings 7, 8 spark plugs 23 extend laterally into the outer ends of the cylinders 1, 2, 3, 4.

The pistons 24 of the cylinders 1, 2, 3, 4 are connected by connecting rods 25 in diametrically opposite pairs to a pair of cranks 26, 27 arranged side by side in 90 degree angular relation on a crank shaft 28 extending axially in the casing 5 in the rear part thereof.

The crank shaft 28 is journaled at one end in a stub shaft 29 extending axially from a web 30 forming a closure for the power transmitting end of the casing 5. The other end of said shaft 28 is journaled in an axial, step bearing 31 formed in one side of a spider 32 fixed in the casing 5 in the approximate transverse center thereof by bolts 33 and including a hub 34 and radial side arms 35 arranged in opposite pairs in 90 degree angular relation and serving a purpose presently seen.

The casing 5 is rotatably supported by the following means: The stub shaft 29 is journaled in a bearing bracket 36. Extending axially from the hub 34 of the spider 32 out of the control end of the casing 5, and having its inner end telescopically fitted over a bearing flange 37 on said hub, is a hollow, tubular shaft 38 in which said hub is rotatably mounted by means of said flange 37. The outer end of the shaft 38 is suitably fixed to a diametrical cross arm 39 surmounting and fixed on a suitable frame represented at 40. Rotatably mounted on the shaft 38 and extending out of said control end of the casing 5 is a sleeve 41 having similarly mounted thereon a sleeve 42. The inner and outer sleeves 41, 42 will presently be referred to in detail. An annular head 43 suitably secured, as at 44, to a circumferential end flange 45 on the sleeve 42 is journaled on the casing 5.

At this point it may be explained that the shaft 38 forms part of a fuel inlet line which includes an axial chamber 46 in the hub 34 of the spider 33 with which said shaft communicates, a pair of diametrically opposite radial ports 47 in said hub leading out of said chamber 46, and a pair of radial inlet pipes 48 fixed at inner ends thereof in the hub 34 and establishing communication between said ports and the before-mentioned ports 20 from which the manifold pipes 18 extend. The outer ends of the pipes 48 are secured to the casing by the beforementioned bolts 19. The outer end of the shaft 38 may be connected to a suitable carburetor, not shown, by a fitting represented at 45.

Operation of the crank shaft 28 rotates the casing 5 oppositely at the same ratio of speed through a planetary gear drive now to be described. Fast on the inner end of the crank shaft 28 is a driven gear 50 in mesh with gears 51 fast on shafts 52 journaled in the pairs of side arms 35 of the spider 32 and extending parallel with the axis of the hub within the casing 5, said shafts having gears 53 fast thereon and meshing with a sun gear 54 fast on the inner end of the shaft 38.

Figure 14:
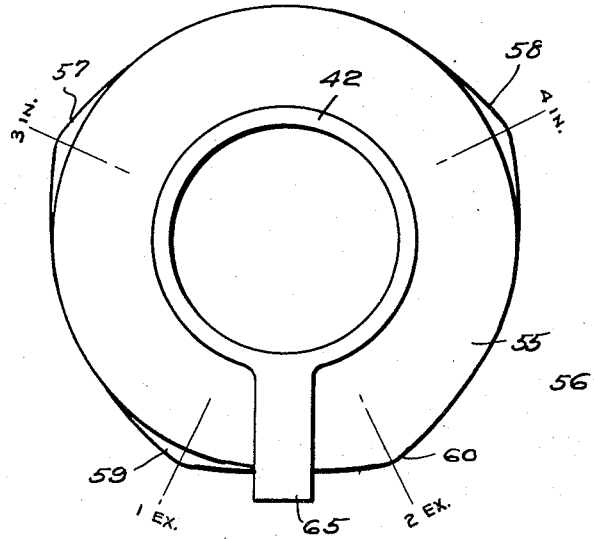
Figure 15:
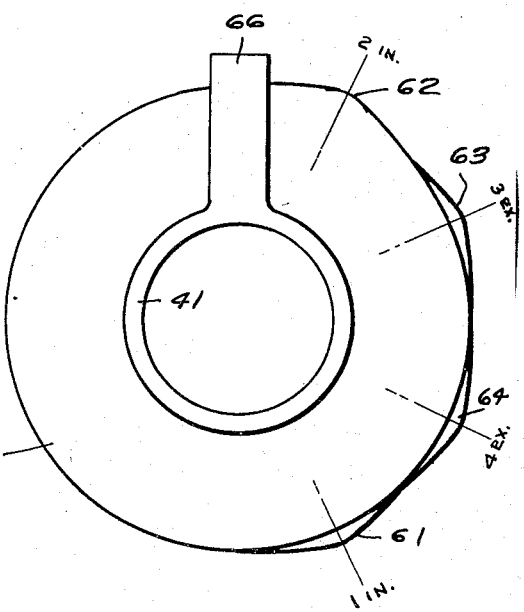
Figure 16:
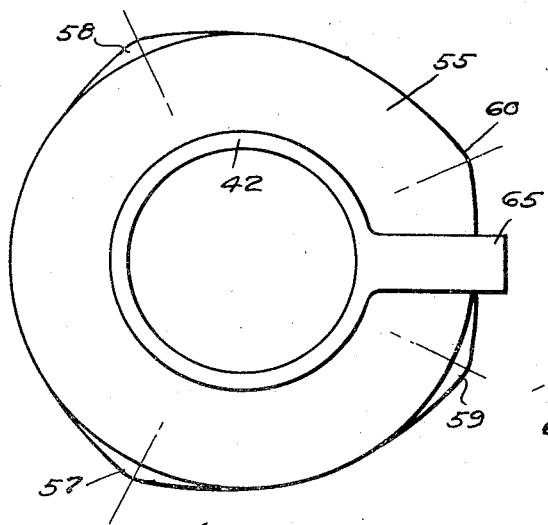
Figure 17:
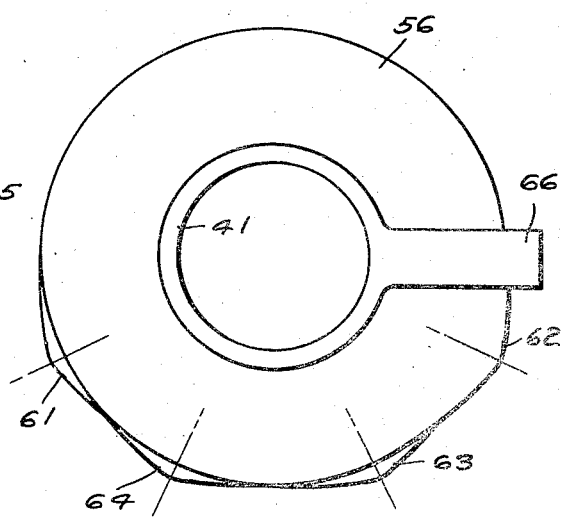

The intake and exhaust valves 12, 13 are operated under rotation of the casing 5 by valve operating mechanism, the primary elements of which are a pair of cam disks 55, 56 carried concentrically by the sleeves 42, 41, respectively, in side-by-side relation, in the casing 5, and of which said sleeves form an integral part. Each cam disk 55, 56 is provided with four peripheral cams spaced circumferentially around the same in laterally staggered relation for a purpose presently seen. As best shown in Figures 14, 15, cam disk 55 is provided with cams 57, 58 for operating the intake valves 12 of cylinders 3 and 4, and with two cams 59, 60 for operating the exhaust valves 13 of cylinders 1 and 2, whereas, cam disk 56 is provided with two cams 61, 62 for operating the intake valves of cylinders numbered 1 and 2, and with two cams 63, 64 for operating the exhaust valves of cylinders numbered 3, and 4. The cam disks 55, 56 are settable around the shaft 38 in opposite directions, relatively, as indicated by the arrows in Figures 14, 15 to position the same, on the one hand, for operation of the engine forwardly, and, on the other hand, for operation of the engine reversely, it being understood that in forward operation of said engine, the crank shaft 28 rotates clockwise and the casing 5 counter-clockwise as viewed from the control end and indicated by the arrows in Figure 6. Conversely, in reverse operation, the crank shaft 28 and casing 5 rotate counter-clockwise and clockwise, respectively. The position of the cam disks 55, 56 for forward operation is shown in Figures 14, 15 and for reverse operation in Figures 16 and 17. The outer ends of the sleeves 42, 41 of the cam disks 55, 56 are each provided with an exterior, radial switch operating arm, 65 in the case of the sleeve 42, and 66 in the case of the sleeve 41, and which extend vertically, oppositely, in the forward drive setting of said cam disks, and horizontally side by side in the reverse drive setting of said disks.

The intake valve operating cams 61, 62, 57, 58 are designed to operate intake valve operating rock shafts 67, 68, 69, 70 in the casing 5 spaced around the same and around the cam disks 55, 56, and journaled in side arms 35 of the spider 32 to extend parallel to the axis of the casing 5. Rocker arms 71 fast on the inner ends of the shafts 67, 68, 69, 70 and engaging the inner ends of the appropriate intake valve stems 14 provide for opening of said intake valves 12 in opposition to springs 15 under rocking of said shafts in one direction.

The exhaust valve operating cams 59, 60, 63, 64 are designed to operate exhaust valve operating rock shafts 72, 73, 74, 75 arranged similarly to shafts 67 to 70 and which are equipped with rocker arms 72, similar to arms 71, for engaging the inner ends of the stems 14 of the exhaust valves 13 and opening the same. Roller carrying arms 76 fast on the outer ends of the rock shafts 67 to 70 and 72 to 75 provide for rocking of said shafts in the proper direction by the appropriate cams.

Means for setting the cam disks 55, 56 is provided in the form of a pair of pulleys 77, 78 fast on the outer ends of the sleeves 41, 42. A double pulley 79 is rotatably mounted on the cross arm 39. A belt 80 connects one side of the pulley 79 with the pulley 77 for rotation of the sleeve 42 and cam disk 56 clockwise, as viewed in Figure 15, under rotation of the pulley 79 in the same direction. A crossed belt 81 connects the other side of the pulley 79 to the pulley 78 for rotation of the sleeve 42 and cam disk 55 counter-clockwise, as viewed in Figure 14, under rotation of the pulley 79 clockwise. The pulley 79 is provided with an operating crank 82.

Coming now to the ignition means, fixed on the control end of the casing 5 in any suitable manner is a pair of inner and outer contact carrying rings 84, 85 concentric to the axis of the casing 5 and formed of suitable insulation material. Referring now particularly to Figures 2 and 13, each ring 84, 85 has embedded in the outer face thereof four disk contacts arranged in like 90 degree angular relation, the contacts on the inner ring 84 being designated 87, 88, 89, 90, and those on the outer ring 85 being designated 91, 92, 93, 94. The contacts 87, 88, 89, 90 of the inner ring 84 are wired to the spark plugs 23 of cylinders numbered 1, 2, 3 and 4, respectively, by leads 95, 96, 97, 98, respectively. The contacts 91, 92, 93, 94 are also connected to said plugs 27 of cylinders numbered 1, 2, 3 and 4, respectively, contacts 91, 92 being interposed in the leads 95, 96, and contacts 93, 94 being wired to lead 97 and lead 98, as at 99 and 100.

Referring now to Figures 2, 7, 8 and 12, suitably mounted on the cross bar 39 is a pair of suitable spring opened plunger type switches 101, 102, normally open, and connected on one side to a suitable source of electrical energy such as battery 103 by a lead 104 branched, as at 105, 106, to said sides of said switches. The other sides of the switches 101, 102 are connected by a pair of leads 107, 108 to a pair of spring pressed brushes 109, 110 suitably mounted, side by side, in the bar 39 to wipingly engage the outer and inner rings 85, 84, the brush 109 in the path of rotation of the contacts on the outer ring 85, and the brush 110 in the path of rotation of the contacts on the inner ring 84. The brushes 109, 110 are suitably insulated from the bar 39, as at 112, and embody binding posts 113, 114 for the attachment of the leads 107, 108 thereto.

At this point it may be explained that the before-mentioned switch operating arms 65, 66 are designed to close the switches 107, 108, respectively, the lever 65 in the normal setting of the cam disk 55 for forward operation of the engine engaging and maintaining the switch 101 closed, and the switch operating arm 66 in the setting of the cam disk 56 for reversing operation of the engine similarly engaging and closing the switch 102.

A suitable balance wheel 115 is provided on the crank shaft 28 within the casing 5.

The casing 5 may be equipped in any suitable manner for transmission of driving power therefrom.

Describing briefly the operation of the engine, with the parts in the position as shown for forward drive, with the crank shaft 28 rotating clockwise and the casing 5 and parts carried thereby rotating counter-clockwise, and with cylinder numbered 1 uppermost, as shown in, let it be assumed, zero position in the cycle of operation, the cam disks 55, 56 are set, in the manner already described, as shown in full lines in Figure 12, in position such that switch 101 is closed by switch operating arm 65 and switch 102 is opened. Referring now to Figure 13, cylinder numbered 1 fires in top, or zero position, that numbered 3 will fire next at 180 degrees in the cycle, cylinder numbered 2 will fire next at 270 degrees in the cycle, and cylinder numbered 4 will fire at 270 degrees in the cycle. With the cam disks 55, 56 set for reverse engine operation, the switch operating lever 66, as shown in dotted lines in Figure 12, will close switch 102 and switch 101 will be opened. In reverse operation, with the casing 5 rotating clockwise, the order of firing is cylinder numbered 1 at zero position in the cycle, cylinder numbered 3 next at zero position, cylinder numbered 2 next at 270 degrees, and cylinder numbered 4 at 90 degrees. Thus, in either direction of movement, all cylinders fire in a single cycle of rotation of the casing, and crank shaft. Although in rotation in one direction there is no firing at 90 degrees in the cycle, and in the other direction, no firing at 180 degrees in the cycle, the power from all four cylinders is equally distributed.

A particular feature of my invention is that the casing 5 and crank shaft 28 rotating in opposite directions impart balance to the engine. Also, it will be noted that either the casing 5 or crank shaft 28, or both, may be used as driving members.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. In an internal combustion engine, a cylindrical casing rotatably mounted for forward and reverse operation, radial cylinders fixed on said casing and arranged in 90 degree angular relation around the same, a crankshaft rotatably mounted in said casing for forward and reverse operation oppositely relative to the direction of operation of said casing and having a pair of cranks thereon, pistons in said cylinders operatively connected to said cranks in pairs, and means to cause each cylinder to fire during a 360 degree cycle of operation of the casing from full cycle position in either direction of operation of the casing and crankshaft, said means causing two of said cylinders to fire in the same angular position of the casing in said cycle of operation in either direction of operation of the casing.

2. In an internal combustion engine, a cylindrical casing rotatably mounted for forward and reverse operation radial cylinders fixed on said casing and arranged in 90 degree angular relation around the same, a crankshaft rotatably mounted in said casing for forward and reverse operation oppositely relative to the direction of operation of said casing and having a pair of cranks thereon, pistons in said cylinders operatively connected to said cranks in pairs, and means to cause each cylinder to fire during a 360 degree cycle of operation of the casing from full cycle position in either direction of operation of the casing and crankshaft, said means causing two of the cylinders to fire in the same angular position in one direction of operation of said casing and two other cylinders to fire in the same and another angular position of the casing in the opposite direction of rotation of said casing.

3. Ignition means for an internal combustion engine of the type embodying a cylindrical casing rotatably mounted for operation in opposite directions, respectively, and cylinders on said casing adapted to fire in different order in rotation of the casing in opposite directions, said means comprising a pair of concentric contact carrying rings adapted to be rotated by said casing, a pair of fixed brushes for engagement with the contacts of said rings, respectively, an electric circuit in which said brushes are interposed, a pair of spring-loaded, normally open switches for closing the circuit to said brushes, respectively, a pair of settable arms for closing said switches, respectively, and manipulative means to set said arms to close said switches selectively.

4. Ignition means for an internal combustion engine of the type embodying a cylindrical casing rotatably mounted for operation in opposite directions, respectively, and cylinders on said casing adapted to fire in different order in rotation of the casing in opposite directions, said means comprising a pair of concentric contact carrying rings adapted to be rotated by said casing, a pair of fixed brushes for engagement with the contacts of said rings, respectively, an electric circuit in which said brushes are interposed, a pair of spring-loaded, normally open switches for closing the circuit to said brushes, respectively, a pair of settable arms for closing said switches, respectively, and manipulative belt and pulley means to set said arms to close said switches selectively.

JOHN STUCKE.